(12) United States Patent
Hayashi

(10) Patent No.: US 6,469,738 B1
(45) Date of Patent: Oct. 22, 2002

(54) FRAMES ALLOWABLE TO BE SHOT IN A DIGITAL STILL CAMERA

(75) Inventor: Hideto Hayashi, Daito (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/028,461

(22) Filed: Feb. 24, 1998

(30) Foreign Application Priority Data

Feb. 26, 1997 (JP) .............................................. 9-042452

(51) Int. Cl.⁷ .......................... H04N 5/76; H04N 5/222
(52) U.S. Cl. ................. 348/231; 348/333.02; 348/376; 396/374; 358/906
(58) Field of Search ................................. 348/231, 232, 348/333.01, 333.02, 333.11, 233, 220; 386/1, 38, 46, 117; 358/906, 909.1; 369/53.24, 53.31, 59.26

(56) References Cited

U.S. PATENT DOCUMENTS 5,027,214 A * 6/1991 Fujimori ..................... 348/233
5,481,303 A   1/1996 Uehara
5,905,528 A * 5/1999 Kodama ..................... 348/231

* cited by examiner

*Primary Examiner*—Ngoc-Yen Vu
(74) *Attorney, Agent, or Firm*—Armstrong, Westerman & Hattori, LLP.

(57) ABSTRACT

A digital still camera comprising a CPU 40 for compressing the one frame image data of a photo-shot having a constant data quantity by JPEG method into a variable length with the maximum data quantity of no more than 30 k bytes, and a flash memory 41 for storing the compressed image data in an image region 412. The CPU 40 counts a number of frames of the image data already written onto the image region 412 and the unused data capacity, obtains a remaining number of frames allowable to be photo-shot from the number of frames of the image data already written onto the image region 412, and obtains a remaining number of frames allowable to be photo-shot from the unused data capacity of the image region 412, and also displays either smaller one as the number of frames allowable to be photo-shot. In case of compressing the data of the photo-shot images by JPEG method and storing the data onto a data recording medium in the digital still camera, it becomes possible to calculate accurately the remaining number of frames allowable to be photo-shot.

16 Claims, 9 Drawing Sheets

FIG. 7

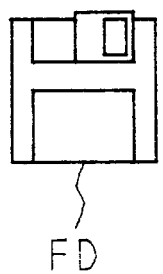
FD

| C11 : TO COUNT NUMBER OF DATA ALREADY WRITTEN ONTO DATA RECORDING MEDIUM |
|---|
| C12 ; TO OBTAIN FIRST VALUE BY DIVIDING WHOLE DATA CAPACITY OF DATA RECORDING MEDIUM ONTO WHICH DATA CAN BE WRITTEN BY MAXIMUM DATA QUANTITY |
| C13 : TO OBTAIN SECOND VALUE BY SUBTRACTING NUMBER OF DATA ALREADY WRITTEN ONTO DATA RECORDING MEDIUM FROM FIRST VALUE |
| C14 : TO COUNT UNUSED DATA CAPACITY OF DATA RECORDING MEDIUM |
| C15 : TO OBTAIN THIRD VALUE BY DIVIDING UNUSED DATA CAPACITY OF DATA RECORDING MEDIUM BY MAXIMUM DATA QUANTITY |
| C16 : TO COMPARE SECOND VALUE WITH THIRD VALUE |
| C17 : TO MAKE SMALLER VALUE OUT OF SECOND VALUE AND THIRD VALUE WRITABLE NUMBER OF DATA ONTO DATA RECORDING MEDIUM |

FIG. 8

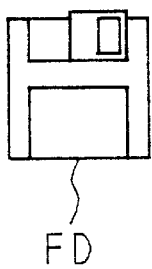

FD

| C21 : TO COUNT NUMBER OF DATA ALREADY WRITTEN ONTO DATA RECORDING MEDIUM ON RESPECTIVE ONES OF PLURAL KINDS OF DATA |
|---|
| C22 : TO OBTAIN FIRST VALUE BY DIVIDING WHOLE DATA CAPACITY OF DATA RECORDING MEDIUM ONTO WHICH DATA CAN BE WRITTEN BY MAXIMUM DATA QUANTITY OF PREDETERMINED KINDS OF DATA OUT OF PLURAL KINDS |
| C23 : TO OBTAIN SECOND VALUE BY SUBTRACTING NUMBER OF DATA ALREADY WRITTEN ONTO DATA RECORDING MEDIUM CONVERTED INTO NUMBER OF PREDETERMINED KIND OF DATA FROM FIRST VALUE |
| C24 : TO COUNT UNUSED DATA CAPACITY OF DATA RECORDING MEDIUM |
| C25 : TO OBTAIN THIRD VALUE BY DIVIDING UNUSED DATA CAPACITY OF DATA RECORDING MEDIUM BY MAXIMUM DATA QUANTITY OF PREDETERMINED KIND OF DATA |
| C26 : TO COMPARE SECOND VALUE WITH THIRD VALUE |
| C27 : TO MAKE SMALLER VALUE OUT OF SECOND VALUE AND THIRD VALUE WRITABLE NUMBER OF DATA ONTO DATA RECORDING MEDIUM |
| C28 : TO CONVERT SMALLER VALUE OUT OF SECOND VALUE AND THIRD VALUE ACCORDING TO RESPECTIVE MAXIMUM DATA QUANTITIES OF PLURAL KINDS OF DATA INTO WRITABLE NUMBER OF DATA ONTO RECORDING MEDIUM |

FRAMES ALLOWABLE TO BE SHOT IN A DIGITAL STILL CAMERA

BACKGROUND OF THE INVENTION

The present invention relates to a method of calculating the writable number of data onto a data recording medium and a recording medium, more particularly, to a method of calculating the number of frames allowable to be shot by a digital still camera and a digital still camera to which such system is applied.

BRIEF SUMMARY OF THE INVENTION

With the rapid popularization of the computer system in recent years, especially of the personal computers, demands for various peripheral apparatuses have been expanded. Above all, as a peripheral apparatus for intake of photographs into the personal computer, instead of the indirect intake procedure using a film scanner, flat bed scanner, or the like of taking in the photographs taken on a conventional film based on silver chloride system, there is noted with attention a digital still camera with which the photo-shot image can be directly taken in as digital data.

Now, in the conventional digital still camera, the image signal of one frame portion shot with a CCD (Charge Coupled Device) which is an image pickup device is converted to digital form and stored straight in a bit map format. Accordingly, the number of frames that can be photo-shot has not been so large. In recent years, however, there has been schemed to increase the number of frames which can be photographed in the compressed data in various data compressing method. Especially, the JPEG (Joint Photograph Experts Group) system which has been standardized in recent years has been developed for compressing the high precision still photographic data for computer system in high efficiency, which has also been utilized as the image file format for CD-ROM contents and Internet application.

Accordingly, in the field of the digital still camera, storage of the photo-shot image data not in the conventional simple bitmap format but in the JPEG format as described above is convenient, because the number of frames which can be stored in a digital still camera can be increased. In view of such a situation, there have been brought into practical use the digital still cameras designed to compress the photo-shot image data by JPEG format and store, but in such a case new problems occur.

In case of recording and storing the data of the photographed image in a data recording medium in the digital still camera by the conventional simple bitmap format, the data quantity is constant, and therefore the remaining number of shots can be easily obtained by dividing the data quantity of the unused region of the data recording medium by the data quantity of the bitmap data for one frame. However, in case of storing the image data by compression by JPEG format in the data recording medium in the digital still camera, the data after compression become the variable length data, so that there is a problem that the remaining number of frames allowable to be taken cannot be accurately calculated.

Different from the ordinary camera for which a silver salt system film is used, the digital still camera is usable to take shots in different resolutions frame by frame. However, because when the resolution is different the data quantity is naturally different, calculation of the remaining number of frames allowable to be shot is made more difficult. Furthermore, in the digital still camera, different from the conventional camera for which a film is used, a constitution to make the voice recording possible at the same time can be easily adopted. In case such a constitution is taken, voice data recording is also necessitated, which involves the greater difficulty in calculating the remaining number of frames allowable to be shot. However, it is the essential information for the user to grasp how many remaining shots can be taken, and accordingly it is a question never to be neglected for the manufacturer.

The present invention has been made in reflection of the situation as reviewed above. Concretely, it has an object to provide a method for calculating the number of the remaining frames allowable to be shot in case of recording and storing in the data recording medium in the digital still camera in compressing the image data of different data quantities shot in various resolutions in a digital still camera by a compression method in which the data after compression become the variable length data; a digital still camera to which above method is applied; and further, the calculating method per se; and a recording medium in which such computer program is recorded.

The method for calculating the writable number of data whose maximum data quantity is no more than the predetermined quantity of a variable length onto a data recording medium of the present invention, comprises the steps of: counting the number of the data already written onto the data recording medium; obtaining a first value by dividing the whole data capacity of the data recording medium onto which data can be written by the maximum data quantity; obtaining a second value by subtracting the number of data already written onto the data recording medium from the first value; counting the unused data capacity of the data recording medium; obtaining a third value by dividing the unused data capacity of the data recording medium by the maximum data quantity; comparing the second value with the third value; and making the smaller value out of the second value and the third value the writable number of the data onto the data recording medium.

According to such calculating method of the present invention, in writing the data whose maximum data quantity is no more than the predetermined quantity of the variable length onto the data recording medium, the number of the data written onto the data recording medium is counted, the first value obtained by dividing the whole data capacity of the data recording medium onto which data can be written by the maximum data quantity is obtained; the second value is obtained by subtracting the number of data written onto the data recording medium from the first value; the unused data capacity of the data recording medium is counted; the third value is obtained by dividing the unused data capacity of the data recording medium by the maximum data quantity; the second value is compared with the third value; and as a result, the smaller value out of the second value and the third value is obtained as the writable number of the data onto the data recording medium.

A method for calculating the writable number of plural kinds of data whose respective maximum data quantities differ from each other and are no more than the predetermined quantities of variable length onto a data recording medium of the present invention, comprises the steps of: counting the number of the data already written onto the data recording medium on the respective ones of the plural kinds of data; obtaining a first value by dividing the whole data capacity of the data recording medium onto which data can be written by the maximum data quantity of the predetermined kind of data out of the plural kinds; obtaining a second value by subtracting the number of data already written onto the data recording medium converted into the number of the predetermined kind of data from the first value; counting the unused data capacity of the data recording medium; obtaining a third value by dividing the unused data capacity of the data recording medium by the maximum data quantity of the predetermined kind of data; comparing the second value with the third value; and making the smaller value out of the second value and the third value the writable number of the data onto the data recording medium.

According to such method of the present invention, in writing a plurality of kinds of data whose respective maximum quantities differ from each other and are no more than the predetermined quantity of variable length onto the data recording medium, the number of the data written onto the data recording medium is counted on the respective data of plural kinds, the first value is obtained by dividing the whole data capacity of the data recording medium onto which data can be written by the maximum data quantity of the predetermined kind of data out of the plural kinds; the second value is obtained by subtracting the number of data written onto the data recording medium converted into the number of the data of the predetermined kind from the first value; the unused data capacity of the data recording medium is counted; the third value is obtained by dividing the unused data capacity of the data recording medium by the maximum data quantity of the predetermined kind of data; the second value is compared with the third value; and as a result, the smaller value out of the second value and the third value is obtained as the number of the writable data onto the data recording medium.

The abovementioned method of the present invention, further comprises a step of converting the smaller value out of the second value and the third value according to the respective maximum data quantities of the plural kinds of data into the writable number of data onto the data recording medium.

According to such calculating method of the invention, the smaller value out of the second value and the third value is converted according to the respective maximum data quantities of the plural kinds of data and is obtained as the number of writable data onto the data recording medium.

A method for calculating the number of frames allowable to be photo-shot of a digital still camera which holds the photo-shot images by writing the image data having the maximum data quantity of one frame is a variable length of no more than the predetermined quantity onto a data recording medium of the present invention, comprises the steps of: counting the number of frames of the data already written onto the data recording medium; obtaining a first value by dividing the whole data capacity of the data recording medium onto which data can be written by the maximum data quantity; obtaining a second value by subtracting the number of frames of the image data already written onto the data recording medium; counting the unused data capacity of the data recording medium; obtaining a third value by dividing the unused data capacity of the data recording medium by the maximum data quantity; comparing the second value with the third value; and making the smaller value out of the second value and the third value the number of frames allowable to be photo-shot.

According to such method for calculating the number of frames allowable to be photo-shot in the digital still camera of the present invention, in storing the photo-shot images by writing onto the data recording medium an image data whose maximum data quantity of one frame is no more than the predetermined quantity of a variable length, the number of frames of the image data written onto the data recording medium is counted; the first value is obtained by dividing the whole data capacity of the data recording medium onto which data can be written by the maximum data quantity; the second value is obtained by subtracting the number of frames of the image data written onto the data recording medium from the first value; the unused data capacity of the data recording medium is counted; the third value is obtained by dividing the unused data capacity of the data recording medium by the maximum data quantity; the second value is compared with the third value; and as a result the smaller value out of the second value and the third value is obtained as the number of frames allowable to be photo-shot.

A method for calculating the number of frames allowable to be photo-shot of a digital still camera which holds the photo-shot image by writing plural kinds of the image data having the respectively different maximum data quantity of one frame with a variable length of no more than the predetermined quantity onto the data recording medium of the present invention, comprises the steps of: counting the number of frames of the image data already written onto the data recording medium on the respective ones of the plural kinds of image data; obtaining a first value by dividing the whole data capacity of the data recording medium onto which data can be written by the maximum data quantity of the predetermined kinds of image data out of plural kinds; obtaining a second value by subtracting the number of frames of the image data already written onto the data recording medium converted into the number of frames of the predetermined kinds of image data from the first value; counting the unused data capacity of the data recording medium; obtaining a third value by dividing the unused data capacity of the data recording medium by the maximum data quantity of the predetermined kind of image data; comparing the second value with the third value; and making the smaller value out of the second value and the third value the number of frames allowable to be photo-shot.

According to such method for calculating the number of frames allowable to be photo-shot in the digital still camera of the present invention, in writing onto the data recording medium plural kinds of image data whose maximum data quantity of one frame is respectively different and are no more than the predetermined quantity of a variable length, the number of frames of the image data written onto the data recording medium is counted on the respective ones of the plural kinds of image data; the first value is obtained by dividing the whole data capacity of the data recording medium onto which data can be written by the maximum data quantity of the predetermined kinds out of the plural kinds of data; the second value is obtained by subtracting the value of the number of frames of the image data written onto the data recording medium converted into the number of frames of the predetermined kind of image data from the first value; the unused data capacity of the data recording medium is counted; the third value is obtained by dividing the unused data capacity of the data recording medium by the maximum data quantity; the second value is compared with the third value; and as a result the smaller value out of the second value and the third value is obtained as the number of frames allowable to be photo-shot.

The abovementioned method of the present invention further comprises a step of converting the smaller value out of the second value and the third value according to the respective maximum data quantities of the plural kinds of image data into the number of frames allowable to be photo-shot.

According to such method of the number of frames allowable to be photo-shot with the digital still camera of the invention, the smaller value out of the second value and the third value is converted according to the respective maximum data quantities of the plural kinds of image data and is obtained as the number of frames allowable to be photo-shot.

The digital still camera of the present invention, comprises: image pickup means for picking up an image and generating the image data for one frame having a constant data quantity; image data compressing means for compressing the image data of one frame generated by the image pickup means by a predetermined method and converting into the compressed image data having the maximum data quantity of no more than the predetermined quantity of a variable length; data recording medium for storing the compressed image data converted by the image data compressing means; counting means for counting the number of frames of the image data already written onto the data recording medium, and counting the unused data capacity of the data recording medium; operating means for obtaining a first value by dividing the whole data capacity of the data recording medium onto which the data can be written by the maximum data quantity, obtaining a second value by subtracting the number of frames of the image data already written onto the data recording medium from the first value, obtaining a third value by dividing the unused data capacity of the data recording medium by the maximum data quantity, and comparing the second value with the third value; and displaying means for displaying the smaller value of the comparison result by the operating means as the number of frames allowable to be photo-shot.

According to such digital still camera of the present invention as above, the counting means counts the number of frames of the image data written onto the data recording medium and the unused data capacity of the data recording medium; the operating means obtains the first value by dividing the whole data capacity of the data recording medium onto which the data can be written by the maximum data quantity, obtains the second value by subtracting the number of frames of the image data written onto the data recording medium from the first value, obtains the third value by dividing the unused data capacity of the data recording medium by the maximum data quantity, and compares the second value with the third value; and displaying means displays the smaller value out of the comparison result by the operating means as the number of frames allowable to be photo-shot.

A digital still camera of the present invention, comprises: image pickup means for picking up an image and generating the plural kinds of image data each having different constant data quantity for one frame; image data compressing means for compressing the image data of one frame formed by the image pickup means by a predetermined method and converting into the compressed image data having the maximum data quantity, being different by the respective image data of plural kinds, of no more than the predetermined quantity of a variable length; data recording medium for storing the compressed image data already converted by the image data compressing means; counting means for counting the number of frames of the image data already written onto the data recording medium on the respective image data of plural kinds, and counting the unused data capacity of the data recording medium; operating means for obtaining a first value by dividing the whole data capacity of the data recording medium onto which the data can be written by the maximum data quantity of the predetermined kinds of image data out of plural kinds, obtaining a second value by subtracting the value obtained by converting the number of frames of the image data already written onto the data recording medium into the number of frames of the predetermined kinds of the image data from the first value, obtaining a third value by dividing the unused data capacity of the data recording medium by the maximum data quantity of the predetermined kind of image data, and comparing the second value with the third value; and displaying means for displaying the smaller value out of the comparison result by the operating means as the number of frames allowable to be photo-shot.

In such digital still camera of the present invention as above, the counting means counts the number of frames of the image data written onto the data recording medium on the plural kinds of respective image data and the unused data capacity of the data recording medium; the operating means obtains the first value by dividing the whole data capacity of the data recording medium onto which the data can be written by the maximum data quantity of the predetermined kinds of image data out of plural kinds, obtains the second value by subtracting the value obtained by converting the number of frames of the image data written onto the data recording medium into the number of frames of the predetermined kinds of image data from the first value, obtains the third value by dividing the unused data capacity of the data recording medium by the maximum data quantity of the predetermined kinds of image data, and compares the second value with the third value; and displaying means displays the smaller value out of the comparison result by the operating means as the number of frames allowable to be photo-shot.

Furthermore, the digital still camera as abovementioned of the present invention, wherein the displaying means converts the smaller value out of the comparison results by the operating means according to the respective maximum data quantity of the plural kinds of image data, and displays as the number of frames allowable to be photo-shot.

In such digital still camera of the present invention as above, the displaying means displays the smaller value based on the results of comparison by the operating means as the number of frames allowable to be photo-shot, by converting according to the respective maximum data quantity of plural kinds of image data.

The digital still camera of the present invention, comprises: image pickup means for picking up an image and generating the image data for one frame having a constant data quantity; image data compressing means for compressing the image data of one frame generated by the image pickup means by a predetermined method and converting into the compressed image data having the maximum data quantity of no more than the predetermined quantity of a variable length; voice data generating means for generating the voice data of a constant data quantity by taking in the voice for the predetermined time at picking up images of the image data by the image pickup means; data recording medium for storing the compressed image data converted by the image data compressing means and the voice data generated by the voice data generating means; counting means for counting the number of frames of the image data and the number of voice data written onto the data recording medium, and counting the unused data capacity of the data recording medium; operating means for obtaining a first value by dividing the whole data capacity of the data recording medium onto which the data can be written by the maximum data quantity, obtaining a second value by subtracting the number of frames of the image data and the number of the voice data, which is converted into the number of frames of the image data, already written onto the data recording medium from the first value, obtaining a third value by dividing the unused data capacity of the data recording medium by the maximum data quantity, and comparing the second value with the third value; and displaying means for displaying the smaller value out of the comparison result by the operating means as the number of frames allowable to be photo-shot.

According to the digital still camera of the present invention as above, the counting means counts the number of frames of the image data written onto the data recording medium and the number of the voice data and the unused data capacity of the data recording medium; the operating means obtains the first value by dividing the whole data capacity of the data recording medium onto which the data can be written by the maximum data quantity, obtains the second value by subtracting the number of frames of the image data written onto the data recording medium and the number of the voice data converted to the number of frames of the image data from the first value, obtains the third value by dividing the unused data capacity of the data recording medium by the maximum data quantity, and compares the second value with the third value; and displaying means displays the smaller value out of the comparison result by the operating means as the number of frames allowable to be photo-shot.

Furthermore, the digital still camera as mentioned above of the present invention, wherein the displaying means divides the smaller value out of the comparison results by the operating means by the value obtained by adding "1" to the voice data converted at a predetermined rate into the number of frames of the image data, and displays as the number of frames allowable to be photo-shot.

In such digital still camera of the present invention as above, the displaying means divides the smaller value out of the comparison results by the operating means by the value obtained by adding "1" to the voice data converted at a predetermined rate into the number of frames of the image data, and displays as the number of frames allowable to be photo-shot.

A digital still camera of the present invention, comprises: image pickup means for picking up an image and generating the plural kinds of image data each having different constant data quantity for one frame; image data compressing means for compressing the image data of one frame formed by the image pickup means by a predetermined method and converting into the compressed image data having the maximum data quantity, being different by the respective image data of plural kinds, of no more than the predetermined quantity of a variable length; voice data generating means for generating the voice data of a constant data quantity by taking in the voice for the predetermined time at picking up images of the image data by the image pickup means; data recording medium for storing the compressed image data converted by the image data compressing means and the voice data generated by the voice data generating means; counting means for counting the number of frames of the image data on the respective ones of plural kinds and the number of voice data already written onto the data recording medium, and counting the unused data capacity of the data recording medium; operating means for obtaining a first value by dividing the whole data capacity of the data recording medium onto which the data can be written by the maximum data quantity of the predetermined kinds of the image data out of the plural kinds, obtaining a second value by subtracting the number of frames of the image data and the number of the voice data, which is converted into the number of frames of the predetermined kinds of the image data, already written onto the data recording medium from the first value, obtaining a third value by dividing the unused data capacity of the data recording medium by the maximum data quantity of the predetermined kinds of the image data, and comparing the second value with the third value; and displaying means for displaying the smaller value out of the comparison result by the operating means as the number of frames allowable to be photo-shot.

According to such digital still camera of the present invention as above, the counting means counts the number of frames of the image data written onto the data recording medium and the number of the voice data and the unused data capacity of the data recording medium; the operating means obtains the first value by dividing the whole data capacity of the data recording medium onto which the data can be written by the maximum data quantity, obtains the second value by subtracting the number of frames of the image data written onto the data recording medium and the number of the voice data converted into the number of frames of the image data from the first value, obtains the third value by dividing the unused data capacity of the data recording medium by the maximum data quantity, and compares the second value with the third value; and displaying means displays the smaller value out of the comparison result by the operating means as the number of frames allowable to be photo-shot.

Furthermore, the digital still camera as mentioned above of the present invention, wherein the displaying means divides the smaller value out of the comparison results by the operating means by the value obtained by adding the value of the voice data converted at a predetermined rate into the number of frames of the predetermined kinds of image data and the value of the plural kinds of the image data converted respectively at predetermined rates into the number of frames of the predetermined kinds of the image data, and displays as the number of frames allowable to be photo-shot.

In such digital still camera of the present invention as above, the displaying means divides the smaller value out of the comparison results by the operating means by the value of the voice data converted at a predetermined rate into the number of frames of the predetermined kinds of image data and the value of the plural kinds of the image data converted respectively into the predetermined kinds of the number of frames of the image data, and displays as the number of frames allowable to be photo-shot.

Furthermore, the computer memory product readable by a computer to calculate the writable number of data having the maximum data quantity of no more than the predetermined quantity of variable length onto a data recording medium, the computer readable program code means comprises: computer readable program code means for causing the computer to count the number of the data already written onto the data recording medium; computer readable program code means for causing the computer to obtain a first value by dividing the whole data capacity of the data recording medium onto which the data can be written by the maximum data quantity; computer readable program code means for causing the computer to obtain a second value by subtracting the number of the data already written onto the data recording medium from the first value; computer readable program code means for causing the computer to count the unused data capacity of the data recording medium; computer readable program code means for causing the computer to obtain a third value by dividing the unused data capacity of the data recording medium by the maximum data quantity; computer readable program code means for causing the computer to compare the second value with the third value; and computer readable program code means for causing the computer to make the smaller value out of the second value and the third value the writable number of data onto the data recording medium.

In such computer memory product of the invention as above, in case the step code means recorded therein are read and loaded in the computer such as a personal computer or a digital camera, the number of the data written onto the data recording medium is counted, the first value is obtained by dividing the whole data capacity of the data recording medium is possible by the maximum data quantity, the second value is obtained by subtracting the number of data written onto the data recording medium from the first value, the unused data capacity of the data recording medium is counted, the third value is obtained by dividing the unused data capacity of the data recording medium by the maximum data quantity, the second value is compared with the third value, and as a result, the smaller value out of the second value and the third value is obtained as the number of data allowable to be written onto the data recording medium.

Furthermore, the computer memory product readable by a computer to calculate the writable number of plural kinds of data whose respective maximum data quantities differ from each other and are no more than the predetermined quantities of variable length onto a data recording medium of the present invention, the computer readable program code means comprises: computer readable program code means for causing the computer to count the number of the data already written onto the data recording medium on the respective ones of the plural kinds of data; computer readable program code means for causing the computer to obtain a first value by dividing the whole data capacity of the data recording medium onto which data can be written by the maximum data quantity of the predetermined kinds of data out of the plural kinds; computer readable program code means for causing the computer to obtain a second value by subtracting the number of the data already written onto the data recording medium converted into the number of the predetermined kind of data from the first value; computer readable program code means for causing the computer to count the unused data capacity of the data recording medium; computer readable program code means for causing the computer to obtain a third value by dividing the unused data capacity of the data recording medium by the maximum data quantity of the predetermined kind of data; computer readable program code means for causing the computer to compare the second value with the third value; and computer readable program code means for causing the computer to make the smaller value out of the second value and the third value the writable number of the data onto the data recording medium.

In such computer memory product of the invention as above, in case the step code means recorded therein are read and loaded in the computer such as a personal computer or a digital camera, the number of the data written onto the data recording medium is counted on the respective ones of the plural kinds of data, the first value is obtained by dividing the whole data capacity of the data recording medium onto which the data can be written by the maximum data quantity of the predetermined kinds of data out of the plural kinds, the second value is obtained by subtracting the number of data written onto the data recording medium converted into the number of the data of the predetermined kinds from the first value, the unused data capacity of the data recording medium is counted, the third value is obtained by dividing the unused data capacity of the data recording medium by the maximum data quantity of the predetermined kinds, the second value is compared with the third value, and as a result, the smaller value out of the second value and the third value is obtained as the number of data allowable to be written onto the data recording medium.

The computer memory product of the present invention as above mentioned, further comprises a computer readable program code means for causing the computer to convert the smaller value out of the second value and the third value according to the respective maximum data quantities of the plural kinds of data into writable number of data onto the data recording medium.

In such computer memory product of the present invention as described above, the smaller value out of the second value and the third value is converted according to the respective maximum data quantity of plural kinds and obtained as the number of data allowable to be written onto the data recording medium.

The above and further objects and features of the invention will more fully be apparent from the following detailed description with accompanying drawings.

BRIEF DESCRIPTION OF THE SEVERAL VIEWS OF THE DRAWINGS

FIG. 7 is a schematic view showing a contents of the computer program recorded in onto the recording medium of the present invention; and FIG. 8 is a schematic view showing the contents of the computer program recorded in the recording medium of the present invention.

DETAILED DESCRIPTION OF THE PREFERRED EMBODIMENTS

Figure 1A:
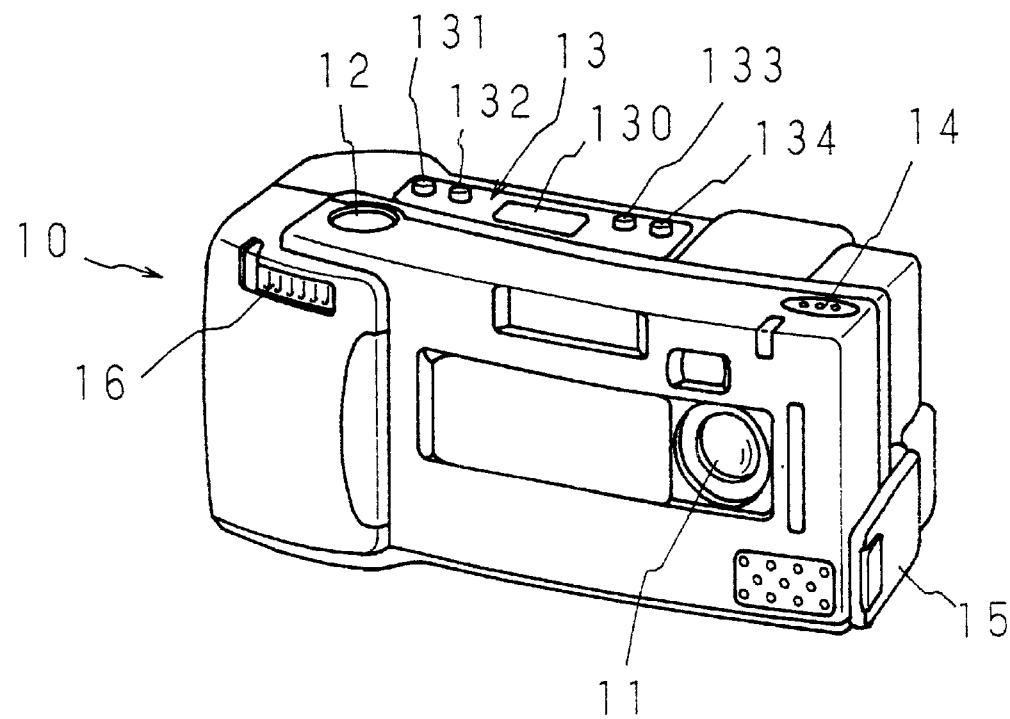
FIG. 1A is a schematic view showing an appearance of the digital still camera of the present invention viewed from the front left side part.
Figure 1B:
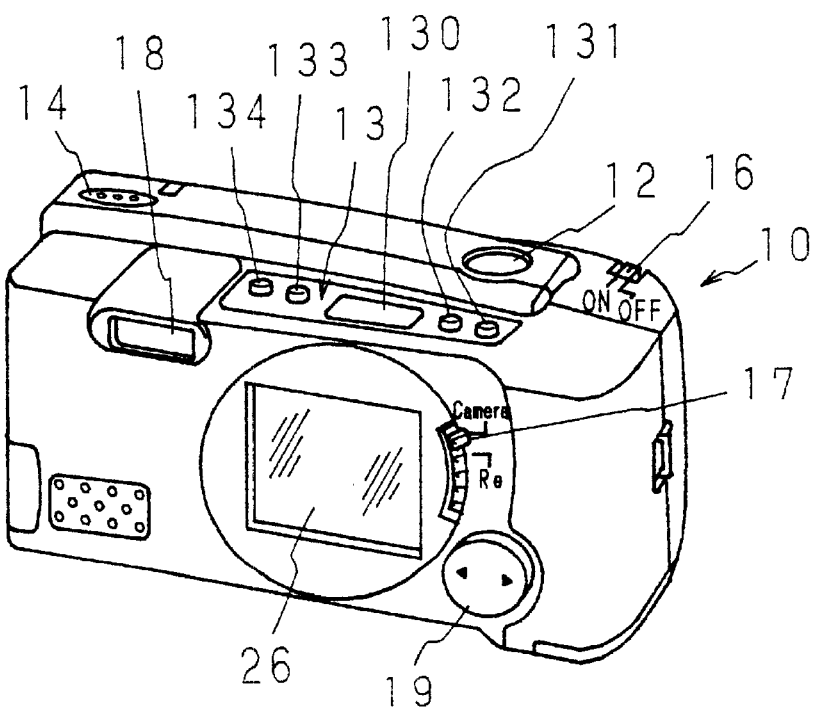
FIG. 1B is a schematic view showing an appearance of the digital still camera of the present invention viewed from the rear right side part.

Hereinafter, the present invention is described in detail based on the drawings which show the embodiments of the invention. FIG. 1 is a schematic view showing the appearance of the digital still camera of the invention, wherein FIG. 1A shows a condition viewed from the front left side part, and FIG. 1B shows a condition viewed from the rear right side part, respectively.

The basic constitution of the digital still camera of the present invention is similar to that of the conventional general digital still camera. A body 10 includes in front thereof an objective lens 11, a shutter button 12 on the upper surface, a control panel 13 including a display panel 130 by LCD and a microphone 14, respectively. The control panel 13 is provided with various control buttons 131 through 134, besides the display panel 130.

A reference numeral lo is a terminal cover, of which details will be described later. When the terminal cover 15 is opened, there is provided on the body 10 side terminals for connecting to this digital still camera a personal computer, television monitor, earphone, etc.

Furthermore, a reference numeral 16 is a monitor switch, which is a selection switch for use or not of the liquid crystal monitor 26 provided on the rear face of the body 10. A reference numeral 17 is a monitor selection switch for switching the display on the liquid crystal monitor 26 between the image caught by the objective lens 11 (on "camera" position) and the image which has already been memorized in the digital still camera ("reproduction" position). Accordingly, when the monitor switch 16 is turned ON and "camera" is selected on the monitor selection switch 17, the image caught by the objective lens 11 is displayed in reproduction on the liquid crystal monitor 26, while when the monitor switch 16 is turned ON and "reproduction" is selected on the monitor selection switch 17, the image which has been photo-shot or the image which is inputted from the personal computer or the like and recorded in a data recording medium provided in the digital still camera is displayed by reproduced on the liquid crystal monitor 26. In this case, the image to be reproduced can be designated by sending forward or backward by the manipulation of a frame advance switch shown by a reference numeral 19.

This digital still camera is provided, as shown by a reference numeral 18, with a finder like the ordinary camera, so that even without using the liquid crystal monitor 26 the photo-shooting itself can be made through the finder 18.

Figure 2:
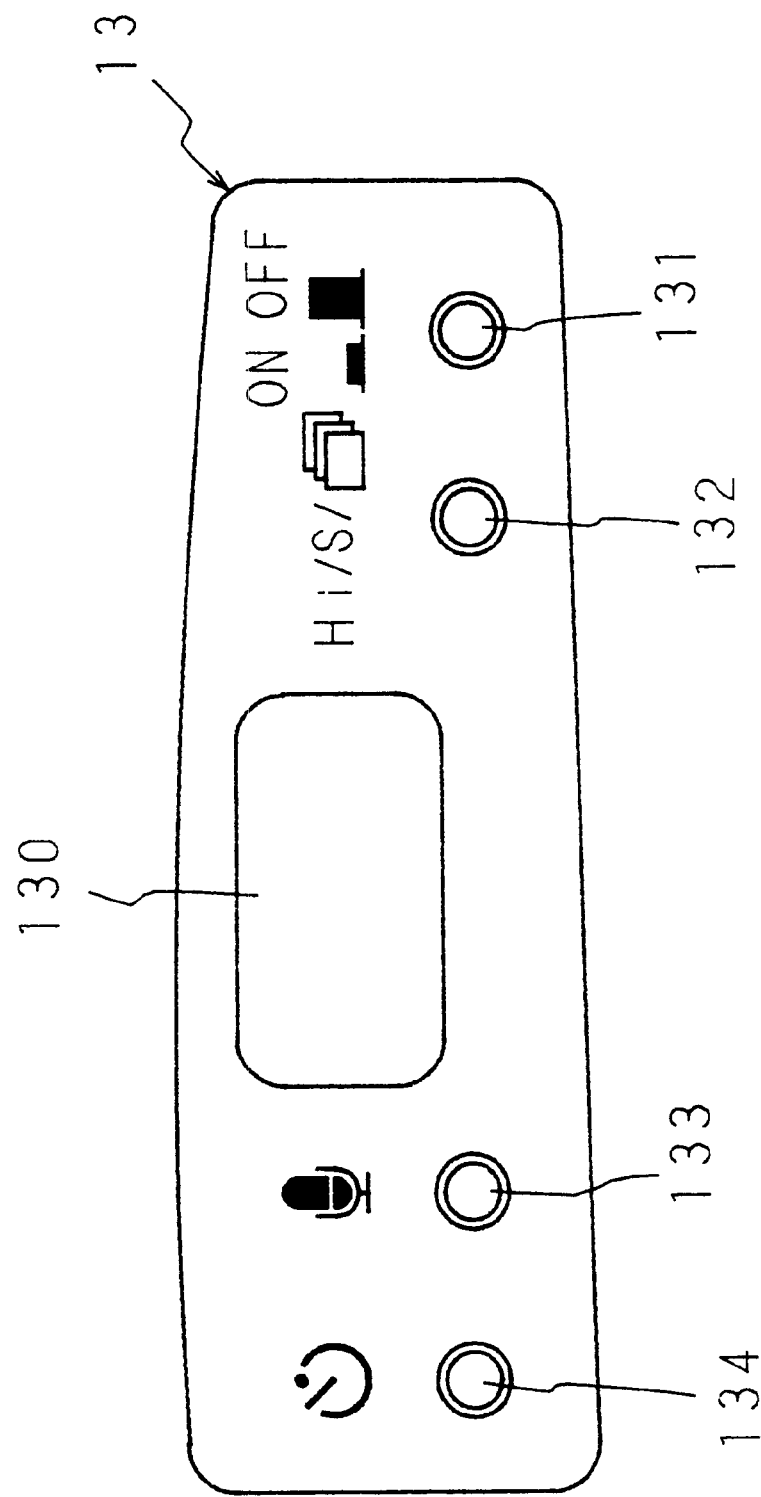
FIG. 2 is a schematic plan view of the digital still camera of the present invention taken from the back side of the body to show the concrete constitution example of a control panel thereof.

FIG. 2 is a schematic plan view showing the concrete constitution example of the control panel 13, wherein there is shown a condition of the body 10 viewed from the back face. As described above, on the control panel 13 a display panel 130 is provided, and in addition, in this embodiment there are four control buttons shown by a reference numerals 131 through 134.

The control button shown by a reference numeral 131 is a main switch for turning ON/OFF the source power for the digital still camera.

The control button shown by a reference numeral 132 is a photo-taking mode button for selecting the photo-taking mode. Concretely, on each depression by the user of this photo-taking mode button 132, the photo-taking mode changes in order of "high resolution mode (Hi)", "standard mode (S)", "continuous shooting mode" and the respective mode comes to be in set condition.

The control button shown by a reference numeral 133 is a voice button for recording voice. This button also shows shifting in order of ON/OFF on each depression by the user, and in case of it being ON state it shows a voice mode to make the recording from the microphone 14 possible. The voice recording by turning ON this voice button 133 cannot be made independently but only during the predetermined duration (in this embodiment, 6 sec.) from the time when the shutter button 12 is depressed in photo-taking image, and the recorded voice data are recorded in relation to the simultaneously photo-shot image data. The condition in which the "high resolution mode (Hi)" is set with the photo-taking mode button 132 and at the same time the voice mode is set with the voice button 133 is hereinafter called "high resolution mode with voice", and the condition in which the "standard mode (S)" is set with the photo-taking mode button 132 and at the same time the voice mode is set with the voice button 133 is hereinafter called "standard mode with voice"

The control button shown by a reference numeral 134 is a self-timer button. By turning this self-timer button 134 ON, the self-timer functions to start counting time.

Figure 3:
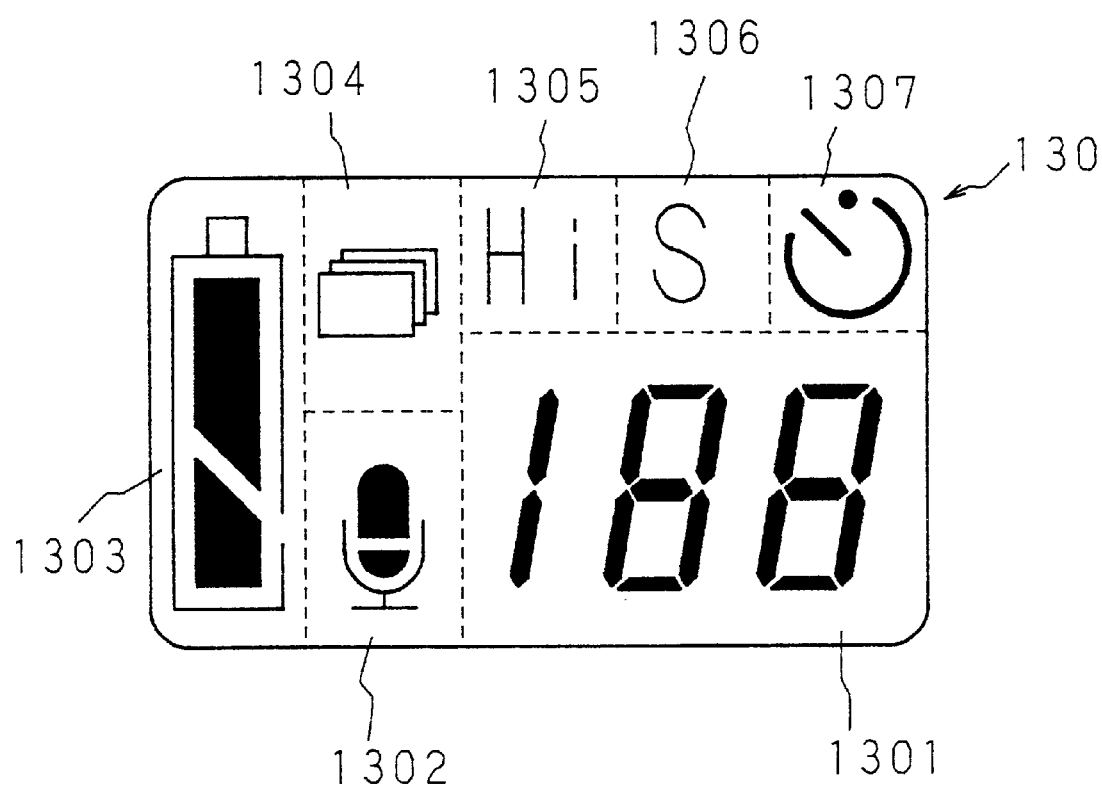
FIG. 3 is a schematic view showing the display condition of the display panel of the digital still camera of the present invention.

FIG. 3 is a schematic view showing the display condition of the display panel 130. In this embodiment, however, all conditions that can be displayed are shown, and this display is different from the display in actual use. A reference numeral 1301 is a display region showing the remaining number of frames that can be photo-shot (hereinafter to be referred to as a remaining number display region). This remaining number display region 1301 is substantially constituted by the segment to display "1" in the first place of three figures (100) or not and the segment to display any one of "0" through "9" in the first place of two figures (10) and one figure (1), respectively. In this embodiment, display is made in the range of "0" through "120" in the decimal number.

A reference numeral 1302 is a voice mode display region showing that the voice button 133 is in ON state, or concretely that the voice recording is possible, where the schematic diagram of microphone is displayed. A reference numeral 1303 is a battery amount display region which shows the remaining amount of battery, in which the schematic diagram of dry battery is displayed. Reference numerals 1304, 1305, 1306 show the photo-taking mode display regions which display respectively the photo-taking mode set at the present time in coordination with the photo-taking mode button 132. Concretely, the region 1304 displays by the schematic diagram formed by laying the squares which denote frames that the continuous shooting mode is set; the region 1305 displays by the letters "Hi" that the high resolution mode is set; and the region 1306 displays by the letter "S" that the standard mode is set. A reference numeral 1307 is a region showing that the self-timer functions, in other words, that the self-timer is being started, for which there is used a symbol which is generally used in the conventional camera.

Figure 4:
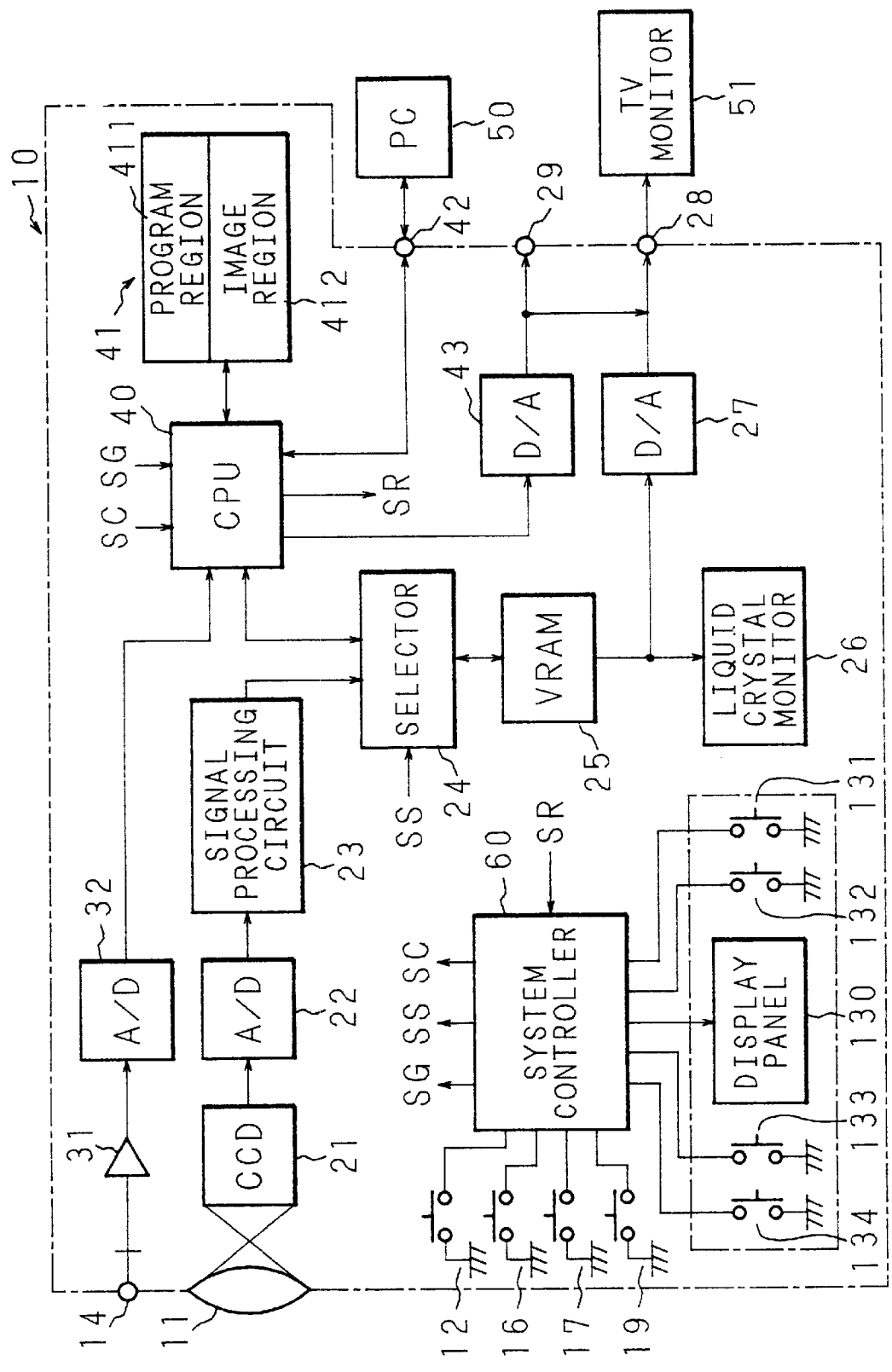
FIG. 4 is a functional block diagram showing an example of the internal constitution of the digital still camera of the invention.

FIG. 4 is a functional block diagram showing the internal constitution example of the digital still camera of the invention whose appearance is shown in FIG. 1. The internal constitution of this digital still camera is formed by utilizing the microcomputer system.

A reference numeral 60 shows a system controller which manages the whole control of the digital still camera, with which there are connected the main switch 131, various control buttons 132 through 134, shutter button 12, monitor switch 16, monitor selection switch 17, frame advance switch 19 and display panel 130, and the like. The system controller 60 is started by the switching on of the main switch 131, takes in the ON/OFF signals from the control buttons 131 through 134, shutter button 12, monitor switch 16, monitor selection switch 17, frame advance switch 19, and the like, and generates to output the necessary signals, and also carries out the display control of the display panel 130. The signals to be outputted by this system controller 60 includes, for example, a resolution indication signal SG for indicating the above resolution to a CPU 40, a selection indication signal SS to have the selector 24 carry out the selective control, a frame number calculation indication signal SC to have the CPU 40 carry out the number calculation (calculation of remaining number of frames allowable to be photo-shot), and the like.

The rays incident from the objective lens 11 focus on the light receiving face of the CCD (Charge Coupled Device) 21 which is an image pickup device, and are converted to the analog electric signal corresponding to the brightness thereof. With respect to the analog electric signal to be obtained by this CCD 21, by being periodically scanned at an appropriate timing, the signal of one frame unit is serially transferred to an analog/digital (A/D) converter 22. The A/D converter 22 converts this analog signal of serial input into a digital signal and sends it to a signal processing circuit 23. The signal processing circuit 23 provides the digital signal of serial input with appropriate processing to form the image data of bitmap format and sends it to the selector 24.

To the selector 24, there are connected, in addition to the above signal circuit 23, a video RAM (hereinafter to be referred to as VRAM) 25 and the CPU 40, which selectively connect the source and the destination of the signal physically according to the selection indication signal SS sent from the system controller 60. Concretely, when the shutter button 12 is depressed by the user, the selector 24 transfers the image data sent from the signal processing circuit 23 to the CPU 40. In case the monitor switch 16 is turned ON and the selection switch 17 of the monitor is set to the "camera" position, the selector 24 transfers the image data sent from the signal processing circuit 23 to the VRAM 25. Further, in case the monitor switch 16 is turned ON and the monitor selection switch 17 is set to the "reproduction" position, the selector 24 transfers the image data sent from the CPU 40 to the VRAM 25.

By the image data transfer operation by the selector 24 as above, the image data sent to the VRAM 25 and stored therein are displayed on the liquid crystal monitor 26. Accordingly, in case the monitor switch 16 is turned ON and the monitor selection switch 17 is set to the "camera" position, the image captured by the objective lens 11 is always displayed while being renewed in a constant cycle period. The bitmap image data stored in the VRM 25 is converted to the analog NTSC signal by a digital/analog (D/A) converter 27 and outputted from a TV terminal 28. Accordingly, in case a television monitor 51 is connected to the TV terminal 28, the same image as that displayed on the liquid crystal monitor 26 is also displayed on the television monitor 51.

On the other hand, when the user depresses the shutter button 12, according to the selection indication signal SS outputted by the system controller 60 by sensing it, the selector 24 transfers the image data of one frame unit inputted from the signal processing circuit 23 to the CPU 40. At this time, the monitor selection switch 17 is required to be set to the "camera" position, but ON/OFF of the monitor selection switch 16 is unrelated. As described above, it is possible for the selector 24 to transfer the image data of one frame unit outputted from the CPU 40 side to the VRAM 25, but the particulars of this case will be described later.

The voice signal inputted from the microphone 14 is amplified by an amplifier 31, after which it is sampled by a predetermined sampling cycle period by an A/D converter 32 and inputted to the CPU 40 as a digital voice signal.

The CPU 40 compresses by an appropriate compression method (e.g., JPEG method) the bitmap format image data of one frame unit which is sent from the selector 24 when the shutter button 12 is manipulated, and writes the image data as a compressed image data in an image region 412 of a flash memory 41, at which time it effects a change of the reso-lution according to the photo-taking mode set by the photo-taking mode button 132. For example, when the user sets a high resolution mode (Hi) by the manipulation of the photo-taking mode button 132, the CPU 40 carries out compressing of the image data sent from the selector 24 as it is, in other words, the compressing only in the resolution equal to that obtained with CCD 21 and writes in the image memory region 412 of flash memory 41. When the user designates the standard mode (S) by the manipulation of the photo-taking mode button 132, the CPU 40 thins the image data of one frame portion sent from the selector 24 to, for example, a half, in other words, effects compressing by converting the resolution to ½ of the resolution obtained with the CCD 21 and writes the data onto the image region 412 of the flash memory 41.

The flash memory 41 is divided into the above image region 412 and a program region 411 to be described later. To the image region 412 optional writing and reading of data by CPU 40 are possible, and even in case of the power shutoff the memory contents at that time are maintained. The program region 411 stores the processing procedures by CPU 40, only the reading out by CPU 40 is in principle possible.

Furthermore, when, at the point that the user depresses the shutter button 12, the voice button 133 is also turned ON and the recording of voice simultaneously with image is designated, the CPU 40 takes in the digital voice signal outputted from the A/D converter 32 for the designated duration of time, e.g., 6 sec. equivalent, and writes it onto the image region 412 of flash memory 41 intact. Accordingly, as the data to be written onto the image region 412 of the flash memory 41, there are three kinds of the first data made by compressing the high resolution bitmap image data of one frame, the second data made by compressing the low resolution bitmap image data of one frame, and the third data which is the unmodified voice data for the predetermined duration of time.

In case the user has set the monitor switch 16 ON and the monitor selection switch 17 to the "reproduction" position, as described above, by the output to the VRAM 25 by the selector 24 of the image data sent from the CPU 40, the above three kinds of data stored in the image region 412 of the flash memory 41 can be read out by the CPU 40 and reproduced. The compressed image data are decompressed and sent from the selector 24 to the VRAM 25 and stored. In case the voice data relating to the image data is also stored in the image region 412 of the flash memory 41, the data is converted to the analog voice signal with the D/A converter 43 and outputted to an earphone terminal 29 and the TV terminal 28. The image data written onto the VRAM 25 is directly reproduced and displayed in the liquid crystal monitor 26, and outputted also to the TV terminal 28.

Accordingly, in case the user has designated any of the compressed image data already recorded in the image region 412 of the flash memory 41, such image can be displayed in both the liquid crystal monitor 26 and the television monitor 51 as described above, and in case the corresponding voice data are recorded in the image region 412 of the flash memory 41, they can also be reproduced from the earphone terminal 29 and the television monitor 51. Accordingly, by connecting the earphone not shown to the earphone terminal 29, the user may reproduce only the voice data recorded in the image region 412 of the flash memory 41 and listen to it. In reproducing such image data, sequential display can be made by manipulating the frame advance switch 19.

On the other hand, the above three kinds of data stored in the image region 412 of the flash memory 41 are all usable for making transfer from, for example, a PC terminal 42 of RS-232C interface which is a serial terminal for general personal computer to a personal computer (PC) 50. Inversely, it is also possible to write the compressed data in the image region 412 of the flash memory 41 by sending the data compressed by the compression method similar to that used in the digital still camera of the invention (JPEG) to the CPU 40 through the PC terminal 42. However, for the exchange of the data between the digital still camera of the invention as described above and the personal computer 50 and the compression of the image data with the personal computer 50, it is necessary for the exclusive software for the personal computer 50 to be installed.

In case the reproduction of the voice data only is designated, since CPU 40 reads out the designated voice data from the image region 412 of the flash memory 41 and outputs it to the D/A converter 43 intact, the user can reproduce only the voice data recorded in the image region 412 of the flash memory 41 and listen to it with the non-illustrated earphone.

As described above, in the digital still camera of the invention, the image data of the photo-shot frames are compressed and stored in the flash memory 41. However, needless to say, since the capacity of this flash memory 41, more concretely the image region 412, is limited, it is necessary to calculate how many number of frames remain to be photo-shot, or more concretely, how many remaining frames of compression image data can be stored in the image region 412 of the flash memory 41, and to inform the user of the results by displaying in the region 1301 for displaying the remaining number of shots in the display panel 130.

In the digital still camera of the invention, the calculation as described above is performed in a predetermined timing, e.g., the timing for the main switch 131 to be turned ON, the timing for the shutter button 12 to be depressed and the image data of one frame to be newly written onto the flash memory 41, the timing for the image data inputted from the personal computer 50 to be newly written onto the flash memory 41, etc. by the fact that the CPU 40 examines the contents of the image region 412 of the flash memory 41 according to the instructions outputted from the system controller 60, and the results thereof are informed to the system controller 60. The system controller 60 displays the remaining number of frames allowable to be photo-shot in the remaining number of frame display region 1301 of the display panel 130 as described above.

As described above, in the digital still camera of the invention, there are stored the data made by compressing the two kinds of the image data having the different data quantities and the voice data having the data quantity still different from them in the flash memory 41. The two kinds of the image data are stored in the flash memory 41 after the original data are compressed by JPEG method. However, because, in the JPEG method, the compression rates differ depending on the condition of the original bit map image data, it does not necessarily follow that, when the same quantity of data are compressed the same quantity of compressed data are obtained.

Also, in the digital still camera of the present invention it is also possible to receive the compressed image data from the personal computer 50 through the PC terminal 42 and store them in the flash memory 41. In this case, as the compressed image data sent from the personal computer 50 has a possibility of being formed by a method utterly different from the method of the digital still camera of the invention, it is beyond prediction what quantity of data will be inputted, so that from this aspect the calculation of the remaining number of frames allowable to be photo-shot becomes complicated.

Figure 5A:
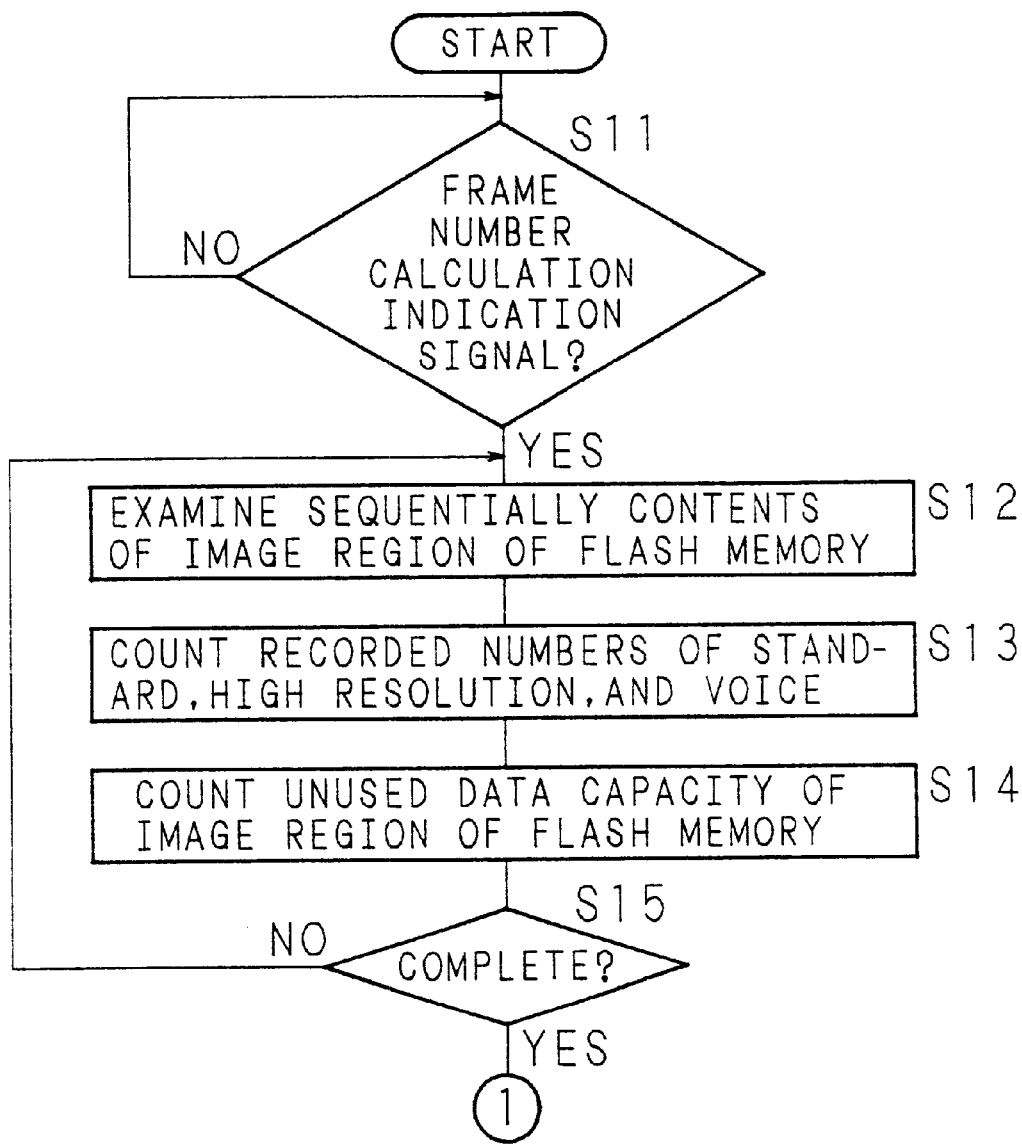
FIG. 5A and FIG. 5B are flow charts showing the control procedure of CPU for illustrating the motion of the digital camera of the present invention.
Figure 5B:
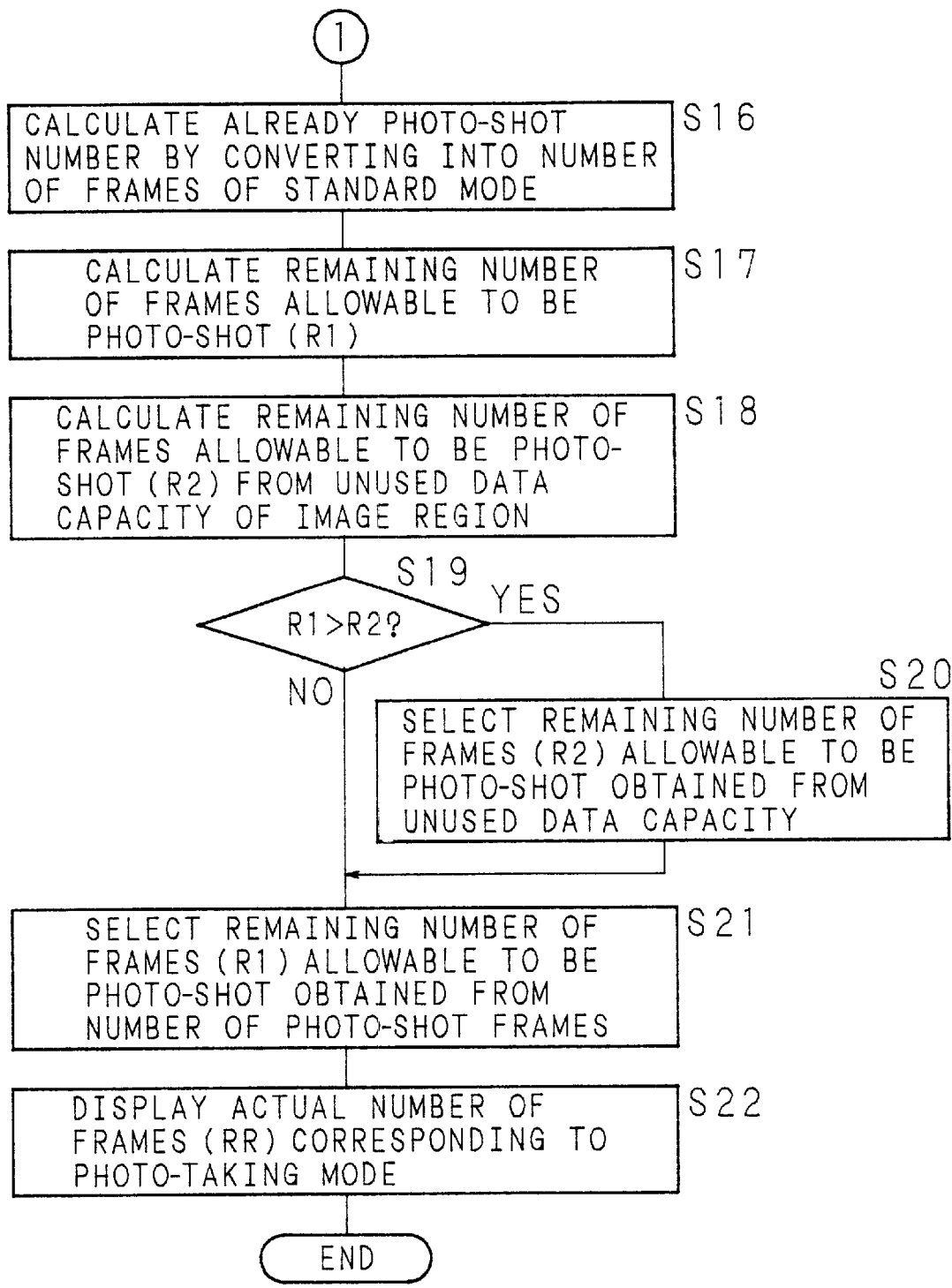

Hereinafter, the calculating method of the number of frames allowable to be photo-shot with the digital still camera of the invention executed by the CPU 40 is explained with reference to the flow charts of FIG. 5A and FIG. 5B which show control procedures of the CPU 40.

As a premise, in the digital still camera of the present invention, the photo-shot frame can be stored in the flash memory 41 in either high resolution (high resolution mode) or low resolution (standard mode). In case of the high resolution, the frame is to be compressed to the size of no more than 60 k bytes, and in case of the low resolution, to the size of no more than 30 k bytes, respectively, and stored in the flash memory 41. The voice signals to be inputted from the microphone 14 are to be stored in the flash memory 41 in a constant data quantity of 24 k bytes. In the image region 412 of the flash memory 41 of the digital still camera of the invention, there can be recorded 120 frames of the image data photo-shot in the standard mode, in other words, a region of 3600 k bytes is to be secured for recording the image data (including the voice data).

First, the CPU 40 is in a condition to wait for the frame number calculation indication signal SC to order the calculation of the remaining number of frames allowable to be photo-shot (hereinafter to be referred to as the frame number calculation) to be outputted from the system controller 60 (Step S11). This frame number calculation indication signal SC is given in the timing as described above, e.g., the timing for the main switch 131 to be turned ON, the timing for the shutter button 12 to be depressed and the image data newly or the voice data simultaneously with the image data to be recorded in the flash memory 41, or the timing for the image data inputted from the personal computer 50 to be newly written onto the flash memory 41, etc. from the system controller 60 to the CPU 40.

Next, the CPU 40 examines sequentially the contents of the image region 412 of the flash memory 41 (Step S12). The flash memory 41 is, as described-above, a recording medium for recording the image data and the voice data recorded incidentally therewith, a part of which being secured as the program region 411 of computer program recording medium for control by the CPU 40, concretely for thinning the bitmap image data (change of resolution), compression, unfreezing, frame calculation, etc. In this program region 411, no recording of compressed image data or voice data is made. Accordingly, the CPU 40 examines, in this step S12, the use condition of only the image region 412 which is a data recording medium other than the program region of the flash memory 41.

Concretely, the image region 412 of the flash memory 41 is sectioned in blocks in the predetermined data quantity unit. With respect to the image data recorded in the image region 412 of the flash memory 41, the CPU 40 counts how many frame portions the low resolution image data taken in standard mode are recorded, how many frame portions the high resolution image data taken in high resolution mode are recorded, how many frame portions the voice data are recorded, respectively (Step S13). Simultaneously, the CPU 40 counts the block in which no image region 412 is used, thereby calculating the unused data capacity of the image region 412 of the flash memory 41 (Step S14).

In this manner, when the use condition has been completely examined with respect to all blocks of the image region 412 of the flash memory 41 (Step S15), the CPU 40 calculates the used capacity of the image region 412 of the flash memory 41 by converting into the number of frames photo-shot in the standard mode (Step S16). Now, assuming the actual number of frames photo-shot in the standard mode to be S, the actual number of frames photo-shot in the high resolution mode to be H, and the actual number of recordings of the voice data to be 0, respectively, the CPU 40 calculates the total number of frames photo-shot T converted into the number of frames photo-shot in the standard mode by the following equation (1), and further calculates the remaining number of frames allowable to be photo-shot R1 by the following equation (2) (Step S17).

$$T=S+2H+ \quad (1)$$

$$R1=120-T \quad (2)$$

Next, the CPU 40 calculates the remaining number of frames allowable to be photo-shot R2 from the unused data capacity of the image region 412 of the flash memory 41 (Step S18). Concretely, the value is obtained by dividing the gross total of the unused regions of the image region 412 of the flash memory 41 by the maximum data quantity of one frame in the standard mode (30 k bytes in this embodiment).

And, the CPU 40 compares the remaining number of frames R1 allowable to be photo-shot obtained from the number of photo-shot frames with the remaining number of frames R2 allowable to be photo-shot obtained from the unused data capacity (Step S19), and the smaller one is obtained as the number of frames R allowable to be photo-shot. Concretely, in case the remaining number of frames R1 allowable to be photo-shot obtained from the number of photo-shot frames is larger in number than the remaining number of frames R2 allowable to be photo-shot obtained from the unused data capacity ("YES" in Step S19), the CPU 40 takes the remaining number of frames R2 allowable to be photo-shot obtained from the unused data capacity to be the number of frames R allowable to be photo-shot (Step S20), and inversely, when the remaining number of frames R1 allowable to be photo-shot obtained from the number of photo-shot frames is smaller in number than the remaining number of frames R2 allowable to be photo-shot obtained from the unused data capacity ("NO" in Step S19), the CPU 40 takes the remaining number of frames R1 allowable to be photo-shot obtained from the number of photo-shot frames to be the number of frames R allowable to be photo-shot (Step S21). The result is notified from the CPU 40 to the system controller 60 as a calculation result signal SR.

The system controller 60 displays, based on the value of the number of frames R allowable to be photo-shot obtained by the CPU 40 in the manner as described above, the actual number of frames RR allowable to be photo-shot corresponding to the photo-taking mode set by the photo-taking mode button 132 at that time, on the remaining frame number display region 1301 of the display panel 130 (Step S22). Concretely, in case the standard mode (S) is selected by the photo-taking mode button 132, the system controller 60 displays on the display panel 130 the number of frames R allowable to be photo-shot obtained by the CPU 40 as it is; in case the high resolution mode (Hi) is selected, a value of ½ of the number of frames R allowable to be photo-shot obtained by the CPU 40 (R/2); in case the standard mode with voice (S) is selected, a value of ½ of the number of frames R allowable to be photo-shot obtained by the CPU 40 (R/2); and in case the high resolution mode with voice (Hi) is selected, a value of ⅓ of the number of frames R allowable to be photo-shot obtained by the CPU 40 (R/3), respectively.

In the foregoing embodiments, there are applied the methods of calculation of the writable number of data onto the data recording medium of the present invention to the object of the digital still camera. However, in the constitution wherein, for example, in the digital video camera the image data of the frames are recorded on the data recording medium such as a magnetic tape by compression in the MPEG (Moving Picture image coding Experts Group) method, the remaining number of frames allowable to be photo-shot is only expressed as the time allowable for photo-taking, and there is no substantial difference.

In the above embodiments, the data quantities in various image data and voice data, capacity of the flash memory 41, etc. are those exemplified, and needless to say they may be any other numerical amounts. Further, there are designed that, as the computer program recording medium and data recording medium, the flash memory 41 is used by dividing into the program region 411 and the image region 412. However, they may of course be constituted by other recording media, e.g., the program region by ROM or the like, and the image region by RAM, EEPROM, etc. The flash memory 41 itself may be substituted by RAM, EEPROM, hard disk, etc.

Furthermore, in the above embodiments, there are given two kinds of resolutions for the image data, but they are not necessarily limited to those kinds, and the image data compression method is not limited to the JPEG method but may of course be any other system. In short, the present invention is designed to apply to such data that the data of one unit to be recorded on the data recording medium is variable length data.

The present invention is also applicable for the case of making, for example, a so-called electronic album carrying a plurality of photographs by a personal computer. For example, the present invention is effective for the case of making a volume of electronic album so that the data can be recorded in a flexible disk having a data capacity of 1.44 M bytes.

In utilizing the present invention as a software program for such personal computer, a program recorded in a recording medium can be installed in the personal computer to execute the program.

Figure 6:
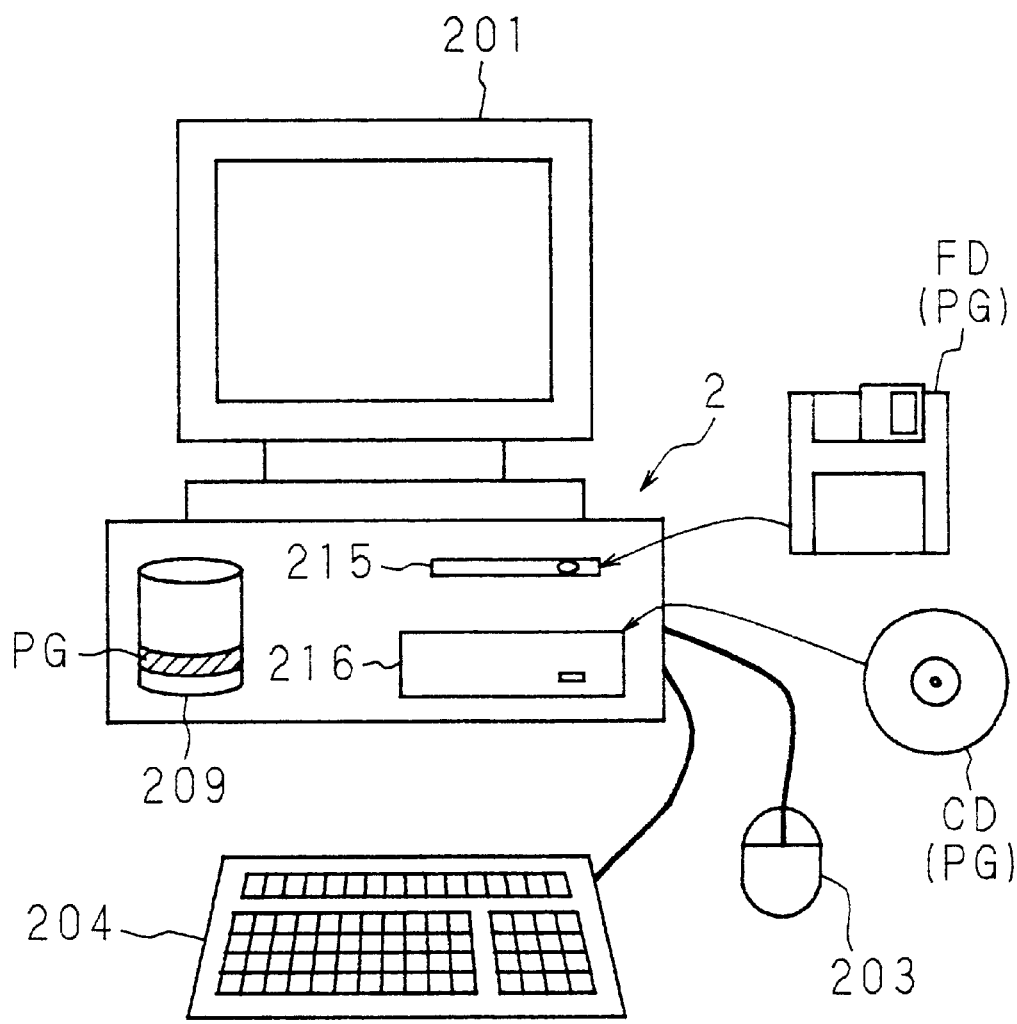
FIG. 6 is a schematic view of a computer in which the computer program recorded in the recording medium of the present invention is installed.

FIG. 6 is a schematic view showing an appearance of a personal computer. This personal computer is furnished with a flexible disk drive 215 for reading the recorded contents (program code) from the flexible disk FD in which the program PG as described above is recorded and/or a CD-ROM drive 216 for reading the recorded contents (program code) from the CD-ROM in which the processing program PG as described above is recorded.

A reference numeral 201 denotes a display device such as a CRT display, 203 denotes a pointing device such as a mouse, and 204 denotes an input device such as a keyboard.

The code of the program PG read from the flexible disk FD by the flexible disk drive 215 or the code of the program PG read from the CD-ROM by the CD-ROM drive 216 is installed in a memory device 209 which is, for example, made by utilizing a hard disk, and executed by the non-illustrated CPU.

In this embodiment, there have been shown as the recording media a flexible disk FD and/or a CD-ROM, but without being limited to them, utilization of magnetic tape, photo-magnetic disk, etc. may of course be possible by combining with the appropriate drive (reading means).

FIG. 7 and FIG. 8 are schematic views showing the contents of the program PG recorded in the flexible disk FD as an example of the recording media.

The flexible disk FD shown in FIG. 7 records the computer program for calculating the writable number of data in writing the data whose maximum data quantity is no more than the predetermined quantity of a variable length, which includes: program code to count the number of the data already written onto the data recording medium (C11); program code to obtain a first value by dividing the whole data capacity of the data recording medium onto which the data can be written by the maximum data quantity (C12); program code to obtain a second value by subtracting the number of the data already written onto the data recording medium from the first value (C13); program code to count the unused data capacity of the data recording medium (C14); program code to obtain a third value by dividing the unused data capacity of the data recording medium by the maximum data quantity (C15); program code to compare the second value with the third value (C16); and program code to make the smaller value out of the second value and the third value the writable number of data onto the data recording medium (C17).

Furthermore, the flexible disk FD shown in FIG. 8 records the computer program for calculating the writable number of plural kinds of data whose respective maximum data quantities differ from each other and are no more than the predetermined quantities of variable length onto a data recording medium, which includes: a program code to count the number of the data already written onto the data recording medium on the respective ones of the plural kinds of data (C21); a program code to obtain a first value by dividing the whole data capacity of the data recording medium onto which data can be written by the maximum data quantity of the predetermined kinds of data out of the plural kinds (C22); a program code to obtain a second value by subtracting the number of the data already written onto the data recording medium converted into the number of the predetermined kind of data from the first value (C23); a program code to count the unused data capacity of the data recording medium (C24); a program code to obtain a third value by dividing the unused data capacity of the data recording medium by the maximum data quantity of the predetermined kind of data (C25); a program code to compare the second value with the third value (C26); and a program code to make the smaller value out of the second value and the third value the writable number of the data onto the data recording medium (C27).

The flexible disk FD shown in FIG. 8 further records a program code to convert the smaller value out of the second value and the third value according to the respective maximum data quantities of the plural kinds of data into writable number of data onto the recording medium (C28).

As described above, according to the method of calculating the writable number of data onto the data recording medium of the invention, in writing a variable length data onto a data recording medium having limited capacity, calculation of the remaining number of the data allowable to be recorded can be easily performed.

According to the digital still camera of the invention and the method of calculating the number of frames allowable to be photo-shot therewith, in a digital still camera of a constitution wherein the photo-shot images are compressed and stored as the image data of variable length with unstable data quantity, the remaining number of frames allowable to be photo-shot is displayed during the use thereof, so that the user can use the digital still camera with reliability.

According to the computer program recording medium of the present invention, besides it being possible to realize the digital still camera as described above, it becomes possible to be utilized for various kinds of software wherein, in writing the variable length data having unstable data quantity onto a data recording medium of limited capacity, the remaining number of data allowable to be recorded is required to be displayed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for calculating, and displaying on a display apparatus, the writable number of data whose maximum data quantity is no more than the predetermined quantity of a variable length onto a data recording medium, comprising the steps of:

counting the number of the data already written onto said data recording medium;

obtaining a first value by dividing the whole data capacity of said data recording medium onto which data can be written by said maximum data quantity;

obtaining a second value by subtracting the number of data already written onto said data recording medium from said first value;

counting the unused data capacity of said data recording medium;

obtaining a third value by dividing the unused data capacity of said data recording medium by said maximum data quantity;

comparing said second value with said third value;

making the smaller value out of said second value and said third value the writable number of the data onto said data recording medium; and displaying on said display apparatus said writable number of the data onto said data recording medium.

2. A method for calculating, and displaying on a display apparatus, the writable number of plural kinds of data whose respective maximum data quantities differ from each other and are no more than the predetermined quantities of variable length onto a data recording medium, comprising the steps of:

counting the number of the data already written onto said data recording medium on the respective ones of said plural kinds of data;

obtaining a first value by dividing the whole data capacity of said data recording medium onto which data can be written by said maximum data quantity of the predetermined kind of data out of said plural kinds;

obtaining a second value by subtracting the number of data already written onto said data recording medium converted into the number of said predetermined kind of data from said first value;

counting the unused data capacity of said data recording medium;

obtaining a third value by dividing the unused data capacity of said data recording medium by said maximum data quantity of said predetermined kind of data;

comparing said second value with said third value;

making the smaller value out of said second value and said third value the writable number of the data onto said data recording medium; and displaying on said display apparatus said writable number of the data onto said data recording medium.

3. The method as set forth in claim 2, further comprising a step of converting the smaller value out of said second value and said third value according to the respective maximum data quantities of the plural kinds of data into the writable number of data onto the data recording medium.

4. A method for calculating, and displaying on a display apparatus, the number of frames allowable to be photo-shot of a digital still camera which holds the photo-shot images by writing the image data having the maximum data quantity of one frame with a variable length of no more than a predetermined quantity onto a data recording medium, comprising the steps of:

counting the number of frames of the data already written onto said data recording medium;

obtaining a first value by dividing the whole data capacity of said data recording medium onto which data can be written by the maximum data quantity;

obtaining a second value by subtracting the number of frames of the image data already written onto said data recording medium from said first value;

counting the unused data capacity of said data recording medium;

obtaining a third value by dividing the unused data capacity of said data recording medium by said maximum data quantity;

comparing said second value with said third value;

making the smaller value out of said second value and said third value the number of frames allowable to be photo-shot; and displaying on said display apparatus said number of frames allowable to be photo-shot.

5. A method for calculating, and displaying on a display apparatus, the number of frames allowable to be photo-shot of a digital still camera which holds the photo-shot image by writing plural kinds of the image data having the respectively different maximum data quantity of one frame with a variable length of no more than a predetermined quantity onto the data recording medium, comprising the steps of:

counting the number of frames of the image data already written onto said data recording medium on the respective ones of the plural kinds of image data;

obtaining a first value by dividing the whole data capacity of said data recording medium onto which data can be written by said maximum data quantity of the predetermined kinds of image data out of plural kinds;

obtaining a second value by subtracting the number of frames of the image data already written onto said data recording medium converted into the number of frames of the predetermined kinds of image data from said first value;

counting the unused data capacity of said data recording medium;

obtaining a third value by dividing the unused data capacity of said data recording medium by said maximum data quantity of said predetermined kind of image data;

comparing said second value with said third value;

making the smaller value out of said second value and said third value the number of frames allowable to be photo-shot; and displaying on said display apparatus said number of frames allowable to be photo-shot.

6. The method as set forth in claim 5, further comprising a step of converting the smaller value out of said second value and said third value according to the respective maximum data quantities of the plural kinds of image data into the number of frames allowable to be photo-shot.

7. A digital still camera, comprising:

image pickup means for picking up an image and generating the image data for one frame having a constant data quantity;

image data compressing means for compressing the image data of one frame generated by said image pickup means by a predetermined method and converting into the compressed image data having the maximum data quantity of no more than the predetermined quantity of a variable length;

data recording medium for storing the compressed image data converted by said image data compressing means;

counting means for counting the number of frames of the image data already written onto said data recording medium, and counting the unused data capacity of said data recording medium;

operating means for obtaining a first value by dividing the whole data capacity of said data recording medium onto which the data can be written by said maximum data quantity, obtaining a second value by subtracting the number of frames of the image data already written onto said data recording medium from said first value, obtaining a third value by dividing the unused data capacity of said data recording medium by said maximum data quantity, and comparing said second value with said third value; and displaying means for displaying the smaller value out of the comparison result by said operating means as the number of frames allowable to be photo-shot.

8. A digital still camera, comprising:

image pickup means for picking up an image and generating plural kinds of image data each having different constant data quantity for one frame;

image data compressing means for compressing the image data of one frame formed by said image pickup means by a predetermined method and converting into the compressed image data having a maximum data quantity, being different by the respective image data of plural kinds, of no more than the predetermined quantity of a variable length;

data recording medium for storing the compressed image data already converted by said image data compressing means;

counting means for counting the number of frames of the image data already written onto said data recording medium on the respective image data of plural kinds, and counting the unused data capacity of said data recording medium;

operating means for obtaining a first value by dividing the whole data capacity of said data recording medium onto which the data can be written by said maximum data quantity of the predetermined kinds of image data out of plural kinds, obtaining a second value by subtracting the value obtained by converting the number of frames of the image data already written onto said data recording medium into the number of frames of said predetermined kinds of the image data from said first value, obtaining a third value by dividing the unused data capacity of said data recording medium by said maximum data quantity of said predetermined kind of image data, and comparing said second value with said third value; and displaying means for displaying the smaller value out of the comparison result by said operating means as the number of frames allowable to be photo-shot.

9. The digital still camera as set forth in claim 8, wherein said displaying means convert the smaller value out of the comparison results by said operating means according to the respective maximum data quantity of the plural kinds of image data, and display as the number of frames allowable to be photo-shot.

10. A digital still camera, comprising:
    image pickup means for picking up an image and generating the image data for one frame having a constant data quantity;
    image data compressing means for compressing the image data of one frame generated by said image pickup means by a predetermined method and converting into the compressed image data having the maximum data quantity of no more than the predetermined quantity of a variable length;
    voice data generating means for generating the voice data of a constant data quantity by taking in the voice for a predetermined time at picking up images of the image data by said image pickup means;
    data recording medium for storing the compressed image data converted by said image data compressing means and the voice data generated by said voice data generating means;
    counting means for counting the number of frames of the image data and the number of voice data written onto said data recording medium, and counting the unused data capacity of said data recording medium;
    operating means for obtaining a first value by dividing the whole data capacity of said data recording medium onto which the data can be written by said maximum data quantity, obtaining a second value by subtracting the number of frames of the image data and the number of the voice data, which is converted into the number of frames of the image data, already written onto said data recording medium from said first value, obtaining a third value by dividing the unused data capacity of said data recording medium by said maximum data quantity, and comparing said second value with said third value; and
    displaying means for displaying the smaller value out of the comparison result by said operating means as the number of frames allowable to be photo-shot.

11. The digital still camera as set forth in claim 10, wherein said displaying means divides the smaller value out of the comparison results by said operating means by the value obtained by adding "1" to the voice data converted at a predetermined rate into the number of frames of the image data, and displays as the number of frames allowable to be photo-shot.

12. A digital still camera, comprising:
    image pickup means for picking up an image and generating the plural kinds of image data each having different constant data quantity for one frame;
    image data compressing means for compressing the image data of one frame formed by said image pickup means by a predetermined method and converting into the compressed image data having the maximum data quantity, being different by the respective image data of plural kinds, of no more than the predetermined quantity of a variable length;
    voice data generating means for generating the voice data of a constant data quantity by taking in the voice for a predetermined time at picking up images of the image data by said image pickup means;
    data recording medium for storing the compressed image data converted by said image data compressing means and the voice data generated by said voice data generating means;
    counting means for counting the number of frames of the image data on the respective ones of plural kinds and the number of voice data already written onto said data recording medium, and counting the unused data capacity of said data recording medium;
    operating means for obtaining a first value by dividing the whole data capacity of said data recording medium onto which the data can be written by said maximum data quantity of the predetermined kinds of the image data out of the plural kinds, obtaining a second value by subtracting the number of frames of the image data and the number of the voice data, which is converted into the number of frames of said predetermined kinds of the image data, already written onto said data recording medium from said first value, obtaining a third value by dividing the unused data capacity of said data recording medium by said maximum data quantity of said predetermined kinds of the image data, and comparing said second value with said third value; and
    displaying means for displaying the smaller value out of the comparison result by said operating means as the number of frames allowable to be photo-shot.

13. The digital still camera as set forth in claim 12, wherein said displaying means divides the smaller value out of the comparison results by said operating means by a value obtained by adding the value of the voice data converted at a predetermined rate into the number of frames of said predetermined kinds of image data and the value of the plural kinds of the image data converted respectively at predetermined rates into the number of frames of the predetermined kinds of the image data, and displays as the number of frames allowable to be photo-shot.

14. A computer memory product readable by a computer to calculate, and display on a display apparatus, the writable number of data having the maximum data quantity of no more than the predetermined quantity of variable length onto a data recording medium, said computer readable program code means comprising:
    computer readable program code means for causing said computer to count the number of data already written onto said data recording medium;
    computer readable program code means for causing said computer to obtain a first value by dividing the whole data capacity of said data recording medium onto which the data can be written by the maximum data quantity;
    computer readable program code means for causing said computer to obtain a second value by subtracting the number of the data already written onto said data recording medium from said first value;
    computer readable program code means for causing said computer to count the unused data capacity of said data recording medium;
    computer readable program code means for causing said computer to obtain a third value by dividing the unused data capacity of said data recording medium by said maximum data quantity;
    computer readable program code means for causing said computer to compare said second value with said third value;

computer readable program code means for causing said computer to make the smaller value out of said second value and said third value the writable number of data onto said data recording medium; and computer readable program code means for causing said computer to display on said display apparatus said writable number of data onto said data recording medium.

15. A computer memory product readable by a computer to calculate, and display on a display apparatus, the writable number of plural kinds of data whose respective maximum data quantities differ from each other and are no more than the predetermined quantities of variable length onto a data recording medium, said computer memory product comprising:

computer readable program code means for causing said computer to count the number of the data already written onto said data recording medium on the respective ones of said plural kinds of data;

computer readable program code means for causing said computer to obtain a first value by dividing the whole data capacity of said data recording medium onto which data can be written by said maximum data quantity of the predetermined kinds of data out of said plural kinds;

computer readable program code means for causing said computer to obtain a second value by subtracting the number of the data already written onto said data recording medium converted into the number of said predetermined kind of data from said first value;

computer readable program code means for causing said computer to count the unused data capacity of said data recording medium;

computer readable program code means for causing said computer to obtain a third value by dividing the unused data capacity of said data recording medium by said maximum data quantity of said predetermined kind of data;

computer readable program code means for causing said computer to compare said second value with said third value;

computer readable program code means for causing said computer to make the smaller value out of said second value and said third value the writable number of the data onto said data recording medium; and computer readable program code means for causing said computer to display on said display apparatus said writable number of data onto said data recording medium.

16. The computer memory product as set forth in claim 15, further comprising a computer readable program code means for causing said computer to convert the smaller value out of said second value and said third value according to the respective maximum data quantities of the plural kinds of data into writable number of data onto said data recording medium.

* * * * *